United States Patent
Rae-Smith et al.

[11] Patent Number: 6,067,073
[45] Date of Patent: May 23, 2000

[54] ELECTRONIC GRAPHIC SYSTEM

[75] Inventors: Adam Rae-Smith, Kintbury; Colin John Wrey, Newbury; Matthew Sumner, Malborough; John Kenneth Cordery, Newbury, all of United Kingdom

[73] Assignee: Quantel Limited, Newbury, United Kingdom

[21] Appl. No.: 08/922,276

[22] Filed: Sep. 3, 1997

[30] Foreign Application Priority Data

Sep. 6, 1996 [GB] United Kingdom .................... 9618669
Feb. 13, 1997 [GB] United Kingdom .................... 9702958

[51] Int. Cl.[7] ........................................................ G09G 5/10
[52] U.S. Cl. ................................................ 345/147; 345/358
[58] Field of Search .................................... 345/147, 148, 345/149, 150, 141, 133, 132, 127, 121, 339, 358

[56] References Cited

U.S. PATENT DOCUMENTS

| 4,514,818 | 4/1985 | Walker ..................................... 364/521 |
| 4,845,431 | 7/1989 | Tsujiuchi et al. ......................... 359/29 |
| 5,579,456 | 11/1996 | Cosman ................................... 345/428 |
| 5,686,939 | 11/1997 | Millward et al. ........................ 345/148 |
| 5,699,078 | 12/1997 | Yamazaki et al. ....................... 345/147 |
| 5,703,621 | 12/1997 | Martin et al. ............................ 345/147 |
| 5,751,843 | 5/1998 | Maggioni et al. ....................... 382/154 |
| 5,781,176 | 7/1998 | Rey et al. ................................ 345/147 |
| 5,796,406 | 8/1998 | Shigematsu et al. .................... 345/358 |
| 5,856,876 | 1/1999 | Sasanuma et al. ....................... 358/300 |
| 5,861,871 | 1/1990 | Venable ................................... 345/150 |
| 5,861,886 | 1/1999 | Moran et al. ............................ 345/358 |

FOREIGN PATENT DOCUMENTS 2089625  6/1982  United Kingdom ............ G09G 1/16

*Primary Examiner*—Steven Sax
*Attorney, Agent, or Firm*—Cooper & Dunham LLP

[57] ABSTRACT

An electronic graphic system comprises an image store for storing data defining an image, a brush store for storing data defining a drawing implement and a stylus and touch tablet for inputting position data and other data. A spatial filter is arranged to respond to the data from the stylus and touch tablet device to filter the brush data to produce brush data defining a drawing implement of a size depending on the data from the stylus and touch tablet device. The filtered brush data is used by a drawing processor to process data in the image store.

43 Claims, 6 Drawing Sheets

ELECTRONIC GRAPHIC SYSTEM

The invention relates to an electronic graphic system.

Electronic graphic or image systems in which the painting or drawing of a colour image can be simulated, or a portion of one image can be merged into another by electronic means are well known. One such graphic system is described in our British patent number 2,089,625 and corresponding U.S. Pat. No. 4,514,818, the teachings of which are incorporated herein by reference. This system includes a user operable input device which may be used by the user to select from a range of colours and a range of intensities and to choose from a set of notional drawing implements for use in the painting or drawing.

When a colour is chosen by the user, values representing the components of the selected colour are stored in a colour register. An implement is chosen by selecting from among different implement representations displayed on a display screen and the selected implement is defined by parameters conforming to a 3-dimensional surface representing the profile of the implement. Generally speaking the implement profile will have a high centre falling away to a lower value toward the periphery of the profile although other profiles may, of course, be defined. The implement profile represents the notional distribution of colour which would be applied by the implement to the image over the area of the image which it covers.

The user operable input device is preferably a touch tablet and stylus combination. The touch tablet is arranged to generate position signals designating the position of the stylus relative to the touch tablet when the stylus is brought into proximity. When the stylus is applied to the touch tablet a pressure signal representing the pressure applied via the stylus to the touch tablet is output from the stylus and stored in a pressure signal register. Position signals are output at regular intervals from the stylus/touch tablet device. For some implements, representing say paint brushes, implement data is generated for each movement of the stylus by the distance between picture points or similar distance, whilst for other implements, say air brushes, implement data is generated at regular time intervals, even if the stylus is held stationary on the touch tablet.

When a position signal is produced, new video signals (pixels) are derived for every picture point in the patch covered by the selected implement. An image store is provided and each new pixel is written at the appropriate picture point in the store. Such new pixels are derived by a processing circuit in accordance with the selected colour data and the distribution of the selected implement, and in response also to the pressure applied to the stylus and to the value of the pixel previously stored at the respective picture point in the store.

The user, who it is envisaged would normally be an artist lacking experience in the use of computer based systems, paints or draws by choosing a desired colour and implement and then manipulating the stylus, causing the touch tablet to generate a series of position signals which define the path or positioning of the stylus. The processing circuit reads pixels from the image store for a patch of picture points in response to each position signal and these pixels are blended by the processor with signals representing the chosen colour in proportions depending upon the respective values of the brush profile and pressure. The blend is then written back to the picture store replacing the pixels previously stored therein.

In general, the blending process is carried out a number of times for each picture point in the image store whether the implement is moving or stationary (assuming in the case of the moving implement that the patch covered by the implement is larger than the spacing between picture points). The final proportion will depend on the number of processing operations performed per pixel.

To enable the user to observe his creation, the stored picture is read repeatedly and the pixels are applied to a TV-type colour monitor, so that the build-up of the picture can be observed. Of course such systems are not limited to TV-type formats and any suitable video format may be adopted. The system described avoids the problem of jagged edges in the image, an unpleasant stepping appearance normally associated with lines not lying horizontally or vertically in a raster display.

The present invention aims to provide for a more realistic simulation of a wider range of implements than has hitherto been possible.

According to one aspect of the invention there is provided an electronic graphic system comprising: an image store for storing data defining an image; user operable means for generating position data representing a position and data representing another parameter; a brush store for storing data defining a drawing implement as a patch of brush data; a spatial filter responsive to said other parameter data for filtering said brush data to produce filtered brush data occupying a patch of a size depending on said other parameter data; and a processor for processing a patch of initial image data in the image store at a location related to the position represented by the position data.

According to another aspect of the invention there is provided an image processing system in which a processor is arranged to respond to the inputting of data defining a position by identifying an area of memory locations including a location corresponding to the defined position, and thereafter to read plural patches of image data of random size from random locations within the area, to modify the image data to the plural patches and to write the thus modified data back to the store so as to replace the patches of image data previously stored therein.

According to another aspect of the invention there is provided a method of processing image data, the method comprising: storing data defining an image in a store; generating position data representing a position and data representing another parameter; storing data defining a drawing implement as a patch of brush data; responding to said other parameter data by filtering said brush data to produce filtered brush data occupying a patch of a size depending on said other parameter data; and processing a patch of initial image data in the store at a location related to the position represented by the position data.

The above and further features of the invention are set forth with particularity in the appended claims and together with advantages thereof will become clearer from consideration of the following detailed description of an exemplary embodiment of the invention given with reference to the accompanying drawings.

Figure 1:
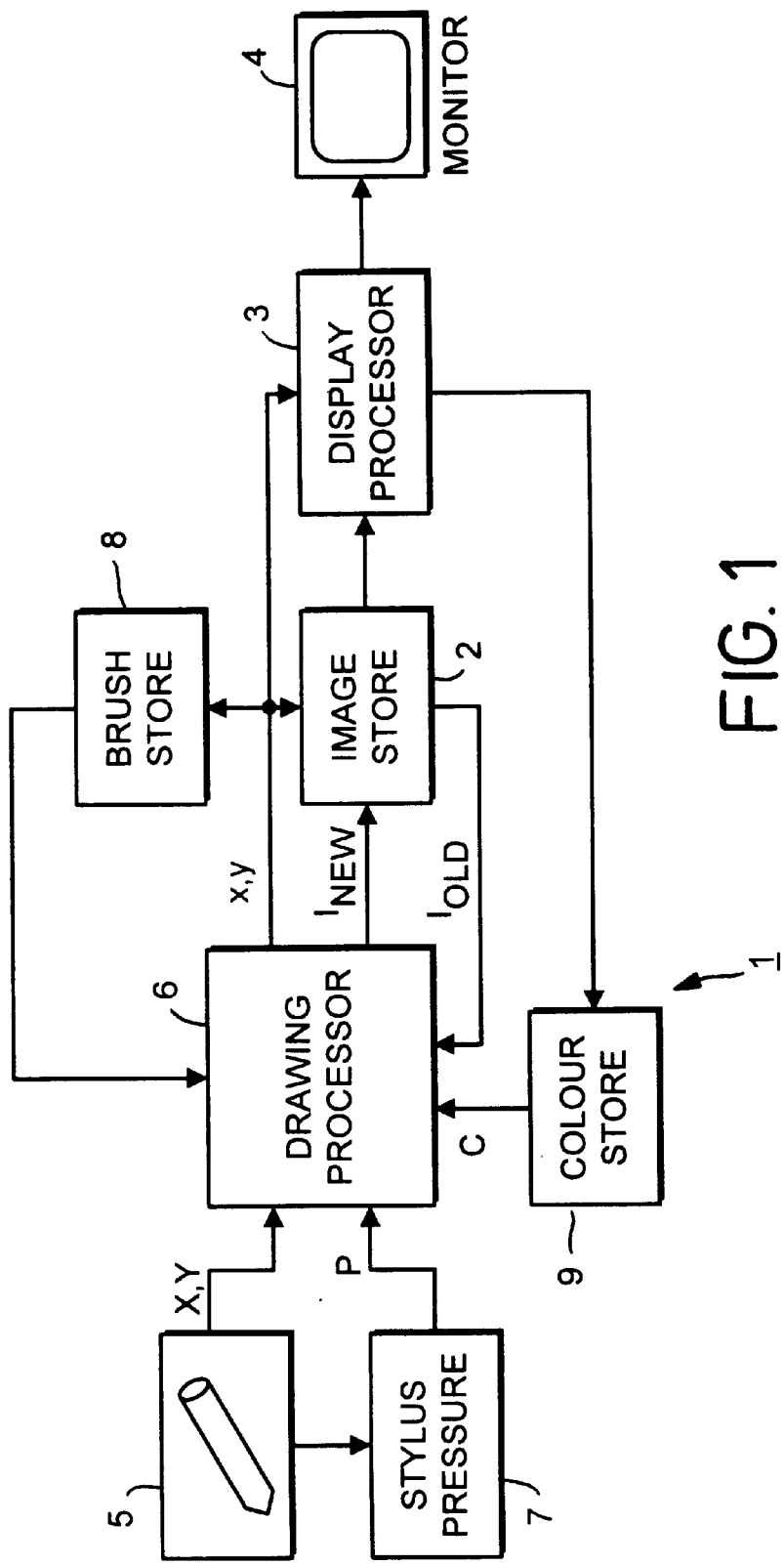
FIG. 1 shows a schematic diagram of an electronic graphic system embodying the invention.

Referring now to FIG. 1 of the accompanying drawings, an electronic graphic system, indicated generally at 1, comprises an image store 2 for storing data defining one or more images including an image being painted, a display processor 3 and a monitor 4. The contents of the image store 2 are read continuously in raster sequence via a serial access port by the display processor 3 and the thus scanned data is output by the display processor 3 for display of the image represented thereby on the monitor 4.

The system 1 also comprises a user operable stylus/touch tablet device 5 by which the user can modify the image data in the store 2, and hence the image represented thereby. As the stylus is drawn across the touch tablet signals representative of the instantaneous position X,Y of the stylus are output to a drawing processor 6. The display processor 3 and the drawing processor 6 are shown as separate entities in order to facilitate understanding by simplifying the following explanation. In practice the two processors 3, 6 may be provided as a single processing unit.

The position information X,Y is provided at a higher resolution than that of the image store 2. That is to say, the spacing between adjacent addresses in the store 2 is significantly larger than the spacing between adjacent positions on the touch tablet 5. It follows that for a given pixel location in the store 2 there are a number of corresponding positions on the touch tablet 5. For example, the spacing between adjacent positions on the touch tablet may be say eight times smaller than that between adjacent addresses in the store 2, and thus there will be sixty four touch tablet positions corresponding to one pixel address in the store. The drawing processor 6 is arranged among other things to convert the instantaneous X,Y position information from the stylus/touch tablet 5 into data representing an equivalent location in the store 2. The equivalent location is defined in terms of a store address and an offset. The offset is calculated as the difference between the store address and the position X,Y of the stylus on the touch tablet. The offset has both vertical and horizontal components each having values of less than one pixel. In the above example the offset would have component values which are integer multiples of ⅛.

As the user moves the stylus on the touch tablet the position data X,Y is continuously generated by the touch tablet 5 and delivered to the drawing processor 6 where it is converted into x,y data identifying patches of store addresses in the store 2. Each patch of addresses is centered over the location in the store equivalent to the corresponding X,Y position data generated by the touch tablet.

The stylus of the stylus/touch tablet device 5 also includes a pressure sensor that outputs a pressure related signal for storage as a parameter in a stylus pressure register 7. Modern stylus touch tablet devices are also capable of generating data defining the orientation (twist) and defining the angle of the stylus in relation to the touch tablet. These parameters may be stored as well as or instead of the pressure data in the stylus register for use by the processor.

Notional drawing implements are predefined in the system 1 and are selectable by the user from a menu of options (not shown) generated by the display processor 3 and displayed on the monitor 4. When the user selects a particular implement, data defiing a continuous three dimensional shape covering a patch of pixels and representing the profile of the implement, as described in our above mentioned patents, is stored in a brush store 8.

A selection of predefined colours is also provided in the displayed menu and the user may select one of these predefined colours or instead may define a colour of his own choosing. Data representing the selected colour is stored by the display processor 3 in a colour register 9.

The image store 2 also includes random access ports for random access writing or reading of data to and from the store 2 independently of the serial raster reading of data to the monitor 4. As the stylus is moved across the touch tablet, data at each addressed patch is read from the store 2 via the random access read port to the drawing processor 6. At the same time, brush shape data from the brush store 8 and colour data from the colour store 9 are also input to the drawing processor 6. The reading of the brush patch data from the brush shape store 6 and the colour data from the colour register 8 is synchronised to the generation of individual addresses within the patch of addresses by the drawing processor 6 which outputs said patch addresses to the brush store 8 and reads signals from the colour store 9.

In the drawing processor 6 the image data $I_{OLD}$ read from the image store 2 is processed with the colour data C, the brush data B and the stylus pressure data P to produce new image data $I_{NEW}$ which is written back to the image store 2.

One way in which the drawing processor 6 may process the image data is to interpolate the image data $I_{OLD}$ and colour data C using the product of the pressure data and the brush data as an interpolation co-efficient K to produce new data $I_{NEW}$ in accordance with the algorithm $I_{NEW}=KC+(1-K)I_{OLD}$. This processing serves to add data representing a patch of colour to the image data in the store. In the displayed image the patch appears as if an area of colour has been stamped into the image. In the following the read-modify-write operation will be referred to as "stamping". The drawing processor 6 is arranged to stamp colour data into the image data at regular intervals of time or distance. Thus, as the stylus is moved over the touch tablet data representing a series of overlapping patches of colour ("stamps") is added to the image data in the store and appears in the displayed image as a continuous line or stroke.

Instead of defining a single colour in the colour store 9 the data stored in the store 9 may define two different colours. In such an arrangement the processor 6 would be arranged to combine the data from the colour store depending on the pressure, twist or angle data from the stylus to produce data defining a colour that is a mix of the two colours. The proportion of each colour would be dependent on the value of the data in the store 7, with a low value resulting in a large contribution from one colour and a high value resulting in a large contribution from the other colour.

The brush store 8 contains at least one array of data defining a drawing implement. Drawing with a single implement of a fixed size is unacceptable and the system is therefore arranged to enable data arrays for different sizes of the same brush to be available for use in painting or drawing. To this end the system comprises a library (not shown) of brush profiles in which each brush is defined by a single set of reference data.

There are several ways in which a reference profile may define a brush. The reference data may be a numerical array representing the height of individual elements forming the three dimensional shape. Alternatively, the reference data may be a mathematical expression representing the profile from which expression an array of data representing the respective values of individual brush elements can be calculated as and when required.

An advantage of predefining the brush profile as a numerical array is that it minimizes calculating overheads, thereby enabling the above described stamping to be effected more quickly than would otherwise be possible. A disadvantage of defining the brush as a numerical array is that a relatively large amount of storage capacity is required to store the data defining the brush profiles. Predefining the brush profile as a mathematical expression minimizes the storage requirements but increases processing overheads.

In the system 1 when a brush is selected from the menu (not shown) by the user, an array of data defining the basic profile of the selected brush is stored in the brush store 8. If the brush is symmetrical (e.g. circular) the reference data is read from the store 8, filtered by a filter to produce data representing a different sized version of the brush, and the thus produced data is written to the brush store 8 where it is stored alongside the reference data. In order to take account of any sub-pixel offset in the position of the brush in the image store during painting an array of data is produced by the filter for each possible subpixel position so that during painting for each sub-pixel position in x and y the appropriate brush data is available in the brush store 8. This process is repeated for every size of the brush that is to be made available to the user. This approach reduces processing overheads because all possible brush data is precalculated but increases storage requirements for the various arrays of data that are generated.

If, however, the brush is unsymmetrical or of limited symmetry (e.g. a custom brush such as described in British Patent Application No. 9618668.9) then only data defining the basic brush profile is stored in the brush store 8 and an appropriate array of data is calculated therefrom during painting for the selected brush size and for each sub-pixel position as the positions are identified. This approach is used for unsymmetrical brushes because such brushes require a large number of data arrays to define every possible size, sub-pixel position and orientation of the brush that may be required during painting. This approach reduces storage requirements for custom brushes while increasing processing overheads.

Figure 2:
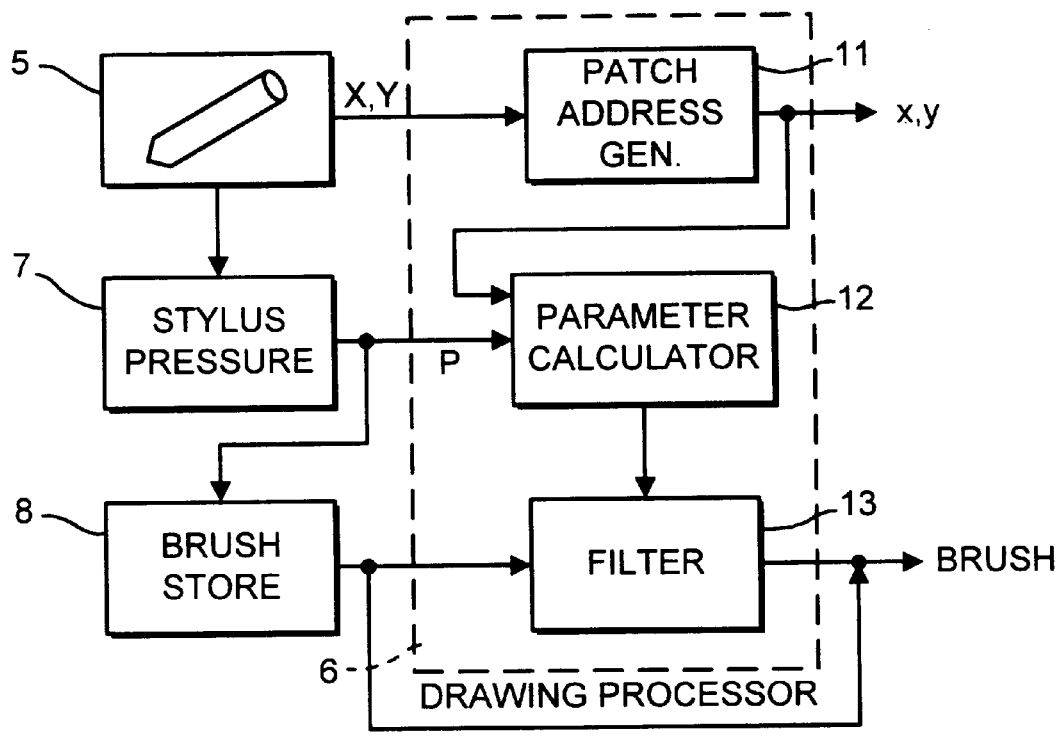
FIG. 2 shows a schematic diagram of a portion of the electronic graphic system of FIG. 1 in greater detail.

Instead of, or as well as, using the pressure data to vary the weightings applied to the colour data and the image data when the same are combined, the processor 6 can be arranged to vary the size of the brush depending on variations in the pressure data. FIG. 2 of the accompanying drawings shows part of the system 1 in greater detail. The drawing processor 6 comprises a patch address generator 11 connected to receive the X,Y position data from the touch tablet 5 and to generate therefrom x,y data defining a patch of addresses surrounding the address in the image store and an offset. The drawing processor 6 also comprises a parameter calculator 12 and a spatial digital filter 13. The parameter calculator 12 receives the x,y offset address data from the patch address generator 11 and the pressure data P from the stylus pressure register 7, and calculates therefrom a set of parameters for use by the filter 13.

The design of spatial digital filters is per se well known and is described for example in co-pending British Patent Application No. 9518443.8. The purpose of the filter 13 is to reduce in size the area (number of pixels) covered by the brush depending on the instantaneous pressure P applied by the stylus on the touch tablet. Typically, if maximum pressure is applied then there will be no reduction in the size of the brush and if, say, a normalized pressure of 0.8 is applied then the area covered is reduced to 80%. When the pressure is less than maximum it is necessary either to filter the brush data down to the smaller area in order to avoid aliasing effects or to select the precalculated array of data for a brush size of 80%. The stylus pressure register 7 is therefore connected both to the parameter calculator 12 to enable the pressure data to be used in the calculation of filtering parameters, and to the brush store 8 to enable the pressure data to be used to look up the appropriate brush data array. The output from the brush store 8 is connected to the filter 13, but the filter 13 can be by-passed if filtering is not necessary.

The parameter calculator 12 also receives the x,y address data including any sub-pixel offset from the patch address generator 11. The offset data enables the parameter calculator 12 to calculate the effect that the offset will have at sub-pixel level when the brush data is used to combine the colour data with the image data in the store. Thus, parameters are calculated by the parameter calculator 12 for use by the filter 13 to produce filtered brush data representing the brush of reduced area depending on pressure and having a sub-pixel offset depending on the position identified by the stylus on the touch tablet in relation to addresses in the image store 2.

Figure 3:
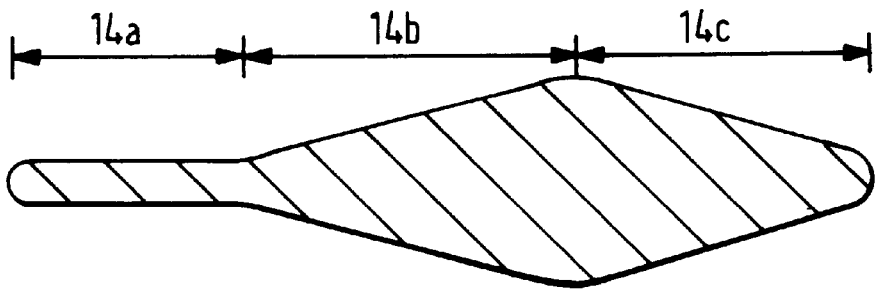
FIG. 3 shows an example of a line that can be drawn using the system.

FIG. 3 of the accompanying drawings shows an example of a line 14 drawn with the system configured as just described. The line 14 comprises a first portion 14a drawn by moving the stylus over the touch tablet with uniform pressure, a second portion 14b drawn by moving the stylus over the touch tablet while increasing the pressure applied by the stylus to the touch tablet, and a third portion 14c drawn by moving the stylus over the touch tablet while decreasing the applied pressure.

That is, as the stylus is moved over the touch tablet, position data x, y is input to the patch address generator 11 which generates a patch address x, y. At the same time pressure data P is input either to the brush store 8 or to the parameter calculator 12 which generates parameter data for use by the filter 13. The output brush data corresponds to a patch of data of a size dependent on the value of the pressure data P. The brush data and the patch address data x, y is used by the drawing processor to effect the read-modify-write processing of the image data in the image store, as described herein with reference to FIG. 1 and in the above referenced patents. This process is repeated each time position data X, Y and pressure data P is output by the stylus/touch tablet device 5.

In the drawing of the portion 14a uniform pressure is applied and therefore the patch of data output from the filter for each x, y position is of the same size and the portion 14a is of uniform width. In the drawing of the portion 14b increasing pressure is applied, and therefore the size of the patches of data output from the filter increase resulting in the width of the portion 14b increasing correspondingly. In the drawing of the portion 14c decreasing pressure is applied, and therefore the sizes of the patches of data output from the filter 13 decrease resulting in the width of the portion 14c decreasing correspondingly.

It will, of course, be appreciated that the system may be arranged to make the width of the "brush" dependent on other parameters, such as the twist or angle of the stylus. A combination of these parameters may also be used.

Figure 4:
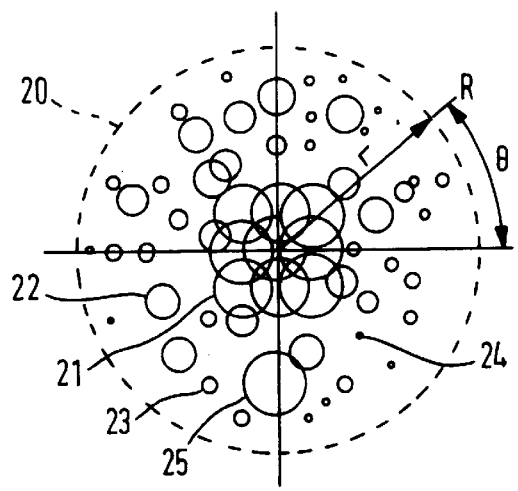
FIG. 4 illustrates an effect that can be produced by the system.

FIG. 4 of the accompanying drawings shows an effect similar to the effect of painting with an airbrush splatter nozzle which can be simulated in the system 1 through the use of random number generators. The effect shown in FIG.

Figure 5:
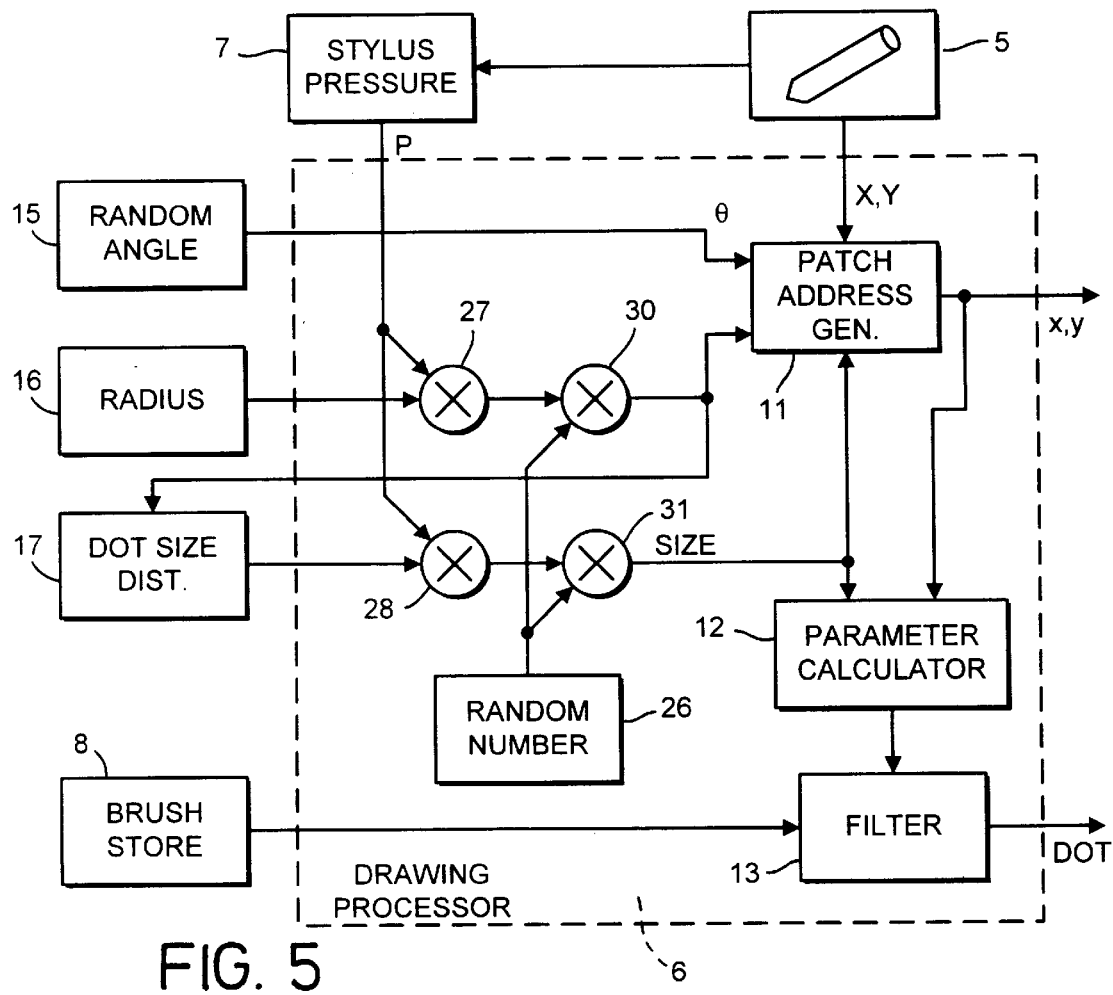
FIG. 5 illustrates a portion of the system of FIG. 1 in greater detail.

4 will be referred to herein as a "spray" effect and can be achieved with the processor 6 configured as shown in FIG. 5 of the accompanying drawings.

In addition to receiving position X,Y data from the stylus 5, pressure data from the pressure register 7 and brush data from the brush store 8, the processor 6 is connected to receive angle data from an angle data generator 15, radius data from a radius register 16 and dot size distribution data from a dot size register 17. As shown in FIG. 4 of the drawings, for each x,y position the spray effect covers an area 20 of maximum radius R. The radius register 16 contains data defining the maximum radius R. The dot size register 17 contains data defining a desired dot distribution. Normally, the desired distribution will be large dots at the centre and small dots at the edge. Of course, other distributions can be defined if so desired.

Within the area 20 stamps 21 to 25 of various sizes are stamped into the image at regular time intervals. The size and position of each stamp is determined from data in the angle data generator 15, the radius store 16 and the dot size store 17, together with pressure data from the stylus pressure register 7 and a random factor generated by a random number generator 26.

The radius register 16 and the dot size register 17 are connected to respective multipliers 27, 28 in the processor. The stylus pressure register 7 is also connected to the multipliers 27, 28. The pressure data is therefore used to vary the maximum radius R of the area 20 and the size of the dots 21 to 25 within the area. If maximum pressure is applied to the stylus then the pressure data has a normalized value of unity and data from the radius register 15 and from the dot size register 17 passes through the multipliers 27, 28 unaltered. If, however, the pressure is less than maximum then the normalised pressure data will be less than unity. Consequently, as the data from the radius register 16 and from the dot size register 17 are passed through the respective multipliers 27, 28 there will be a corresponding reduction in the size of the maximum area 20 and of the dots within the area.

The angle data generator 15 generates data representing $2\pi$ radians, or 360°. Data from the angle generator 15 is input to the patch address generator 11. The outputs from the multipliers 27 and 28 are input to respective multipliers 30, 31 where they too are multiplied by a random number. The output from the angle generator 15 and the multiplier 30 together define a position within the area 20 in terms of an angle $\theta$ and a radius r. This is the position at which a dot will be stamped into the image.

FIG. 5 shows the random number generator 26 connected to the two multipliers 30 and 31 via a common line. The same random number may be applied to each of the multipliers 30, 31 or alternatively a different random number may be applied to each. The random number applied to the radius data should be normalised to a value from 0 to 1 inclusive, so that values of r greater than the maximum radius R are not generated. Similarly, the output from the angle generator 15 should be normalised so that values of $\theta$ greater than $2\pi$ radians (360°) are not generated. The random number applied to the dot size distribution data need not be normalised. If the dot size data is multiplied by a number that is sometimes greater than one the result will be the stamping of random larger dots, such as dot 25 in FIG. 3, toward the boundary area 20.

Since the size of the dot is dependent on its radial position within the area 20, the radius data r from the multiplier 30 is used to address the dot size register 17. Thus, the dot size register 17 will output data defining the size of a dot which is then multiplied by the stylus pressure in the associated multiplier 28 and then by a random number in the associated multiplier 31 to produce data defining the actual dot size.

Data from the two multipliers 30, 31 connected to the random number generator 26 and from the angle generator 15 is input to the patch address generator 11 together with the X,Y position data from the stylus/touch tablet 5. The patch address generator converts the data into x,y data defining an offset patch of addresses. The randomised dot size data output from the multiplier 31 and the x,y data from patch address generator 11 are also input to the parameter calculator 12. The brush store 8 is connected to input data to the filter 13 where it is filtered to produce a patch of data representing a single dot 21 to 25. Data for each dot is stamped into the image data in the image store 2 as described hereinabove with reference to FIG. 1.

Thus, the processor 6 as shown in FIG. 5 is arranged to produce data representing dots of random size and at random position within an area 20. Data for individual dots is produced at regular time intervals and thus the longer the user holds the stylus at a single position, the more dots there will be within the area. Moving the stylus over the touch tablet will result in an image being created in which dots appear to be sprinkled around the path in the image corresponding to the movement of the stylus over the touch tablet.

Figure 6:
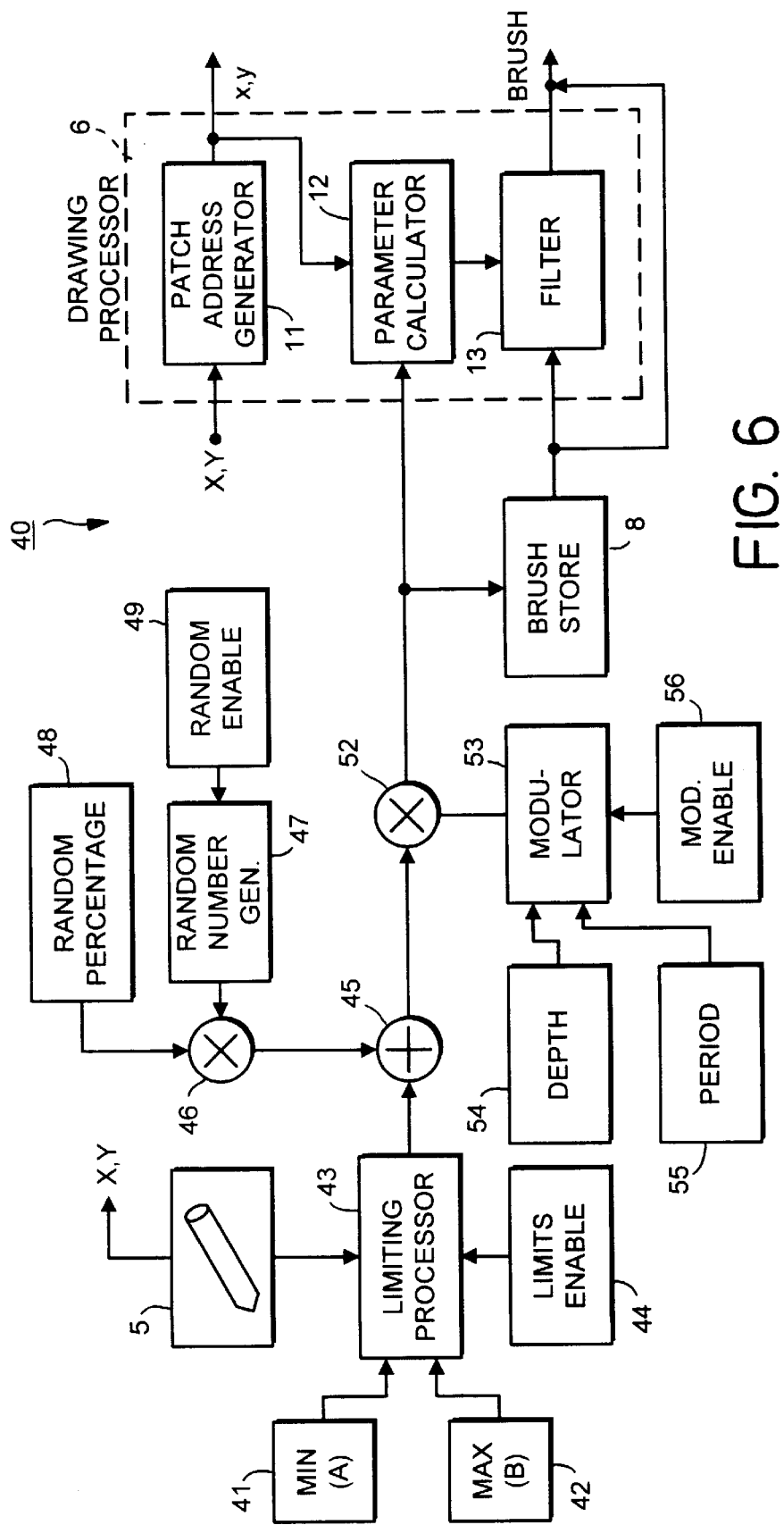
FIG. 6 shows a schematic block diagram of part of a modified version of the system.

A greater degree of control over the above-described effects can be achieved by providing the user with suitable means to limit variation of the brush width. Therefore, as shown in FIG. 6 of the accompanying drawings the system 1 can be modified to include a limiting sub-circuit 40 arranged, among other things, to limit the values of pressure data input to the brush store 8 and the parameter calculator 12. The sub-circuit 40 comprises minimum and maximum value registers 41, 42 in which user selected minimum and maximum values are stored. In the event that the user chooses not to specify minimum and maximum values, the values are set to 0 and 100% respectively. The display processor (not shown in FIG. 6) is arranged to respond to a predetermined manipulation of the stylus on the touch tablet by displaying on a portion of the screen of the monitor (not shown in FIG. 6) a menu of options (not shown) selectable or otherwise variable by the user. Among the options in the menu are boxes representing maximum and minimum values of brush width. Selecting values in these boxes causes corresponding data to be stored in the minimum and maximum registers 41, 42.

The minimum and maximum registers 41, 42 and the stylus/touch tablet device 5 are connected to a processor 43 which processes the data therefrom in accordance with the equation:

$$\text{output} = (1-P)A + PB$$

where output is the value output by the processor 43, P is the value of the pressure data, A is the minimum value and B is the maximum value. The effect of this processing is to scale the pressure data P within the minimum and maximum values, so that a value of P=0 is set to the minimum value a value of P=1 is set to the maximum value and a value of 0<P<1 is set to a value proportionately between the minimum and the maximum values.

The menu (not shown) displayed on the monitor 5 by the display processor 3 includes a "stencil enable" box and the sub-system 40 includes a limits enable register 44 for storing data indicating whether or not the user has chosen to enable the use of limits. The processor 43 responds to the nonenablement of the limits (as indicated by the data in the register 44) by ignoring the data in the minimum and maximum stores 41, 42 and instead outputting the pressure data directly from the stylus/touch tablet device 5.

Data from the processor 43 is input to an adder 45 where it is added with data from a random number multiplier 46. The multiplier 46 is connected to a random number generator 47 and to a random percentage value register 48. The random number generator 47 is arranged to produce a random number between and including 0 and 1. The random number is scaled by the multiplier 46 with the value from the percentage register 48. The effect of adding a scaled random number to the output from the processor 43 is to randomly vary the output by the percentage range. Thus, a pressure of say 20 units and a random percentage of say 20% would result in the adder 45 outputting pressure data that varied randomly between 20 and 24 units. A random enable register 49 is also provided for enabling or disabling the random number generator 47. The contents of the register 49 is determined by user manipulation of a "random" box in the aforementioned menu.

Data from the adder 45 is input to a multiplier 52 where it is multiplied by data from a modulator 53. The modulator 53 is arranged to produce modulating data which varies on a cyclic basis. The depth and period of modulation are specified by data held in depth and period registered 54, 55, which data is specified by the user by way of the aforementioned menu (not shown). A modulation enable register 56 is also provided for switching the modulator 53 on and off. When the modulation facility is selected, the data output from the adder 45 is modulated by a user specified depth and period.

Figure 7:
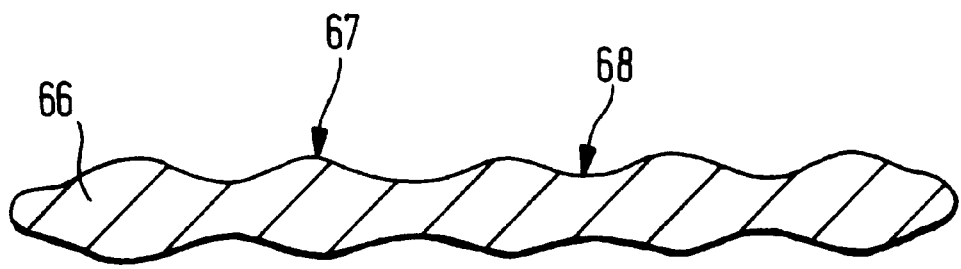
FIG. 7 shows an example of an effect that can be produced by the system.

The modulator 53 calculates a modulation value which is used to vary the width of the brush as the position x, y varies (spatial modulation). Alternatively, the modulator 53 may be connected to a clock (not shown) so as to vary the modulation value in relation to time (temporal modulation). An example of a line 66 drawn by a modulated brush is shown in FIG. 7 of the accompanying drawings. The line 66 is straight, although it could of course follow a curved or convoluted path, and varies between a maximum width, for example at point 67, and a minimum width, for example at point 68. It will be appreciated from consideration of FIG. 7 that modulation can be used to produce uniform effects well suited to borders around pictures for example. Modulation can, naturally, also be used to produce more unusual effects as the user wishes. The output from the multiplier 52 is input to the brush store 8 and the parameter calculator 12 for use thereby as already described hereinabove. Thus, the brush width can be controlled both by time- or position-dependent modulation and by user applied pressure.

The sub-system 40 can be arranged so as to produce an output dependent on a parameter other than applied pressure. For example, the angle or twist of the stylus may be modulated/randomized. Indeed, the sub-system 40 may be arranged to produce a modulated/randomized output that is entirely independent of pressure, angle, twist or any other parameter in response to x, y data when the stylus is brought into contact with the touch tablet. Applying randomness to implement characteristics such as size can result in lines which appear to have a "natural" texture or other effect, for example the appearance of textured paper, etc.

The concept of allowing the user to define maximum and minimum limits can readily be extended to other parameters such as paint density, brush area and spray area or indeed any varying value that may be regularly recalculated, for example at every brush stamp. It follows that more than one characteristic may be simultaneously controlled to produce, for example, a line that varies in width and colour depending on a parameter such as pressure. In this way it would be possible, say, to produce a line which varies from being red when thin to green when thick.

Instead of or as well as making the size of the brush dependent on pressure, the system can be arranged to make the colour applied by the brush dependent on pressure. In this mode of operation the colour store is arranged to store data representing two different colours C1 and C2 and the processor is arranged to derive a colour C to be stamped into the image depending on the applied pressure P in accordance with the equation C=PC1+(1−P)C2. Alternatively, the colour store 9 can be arranged to store data representing a set of different colours in the form of a look up table. The processor 6 is then arranged to select colour data from the look up table depending on the value of the pressure data in the pressure store 7. Again, other parameters may be used as well as or instead of pressure to control colour combining or selecting.

Figure 8:
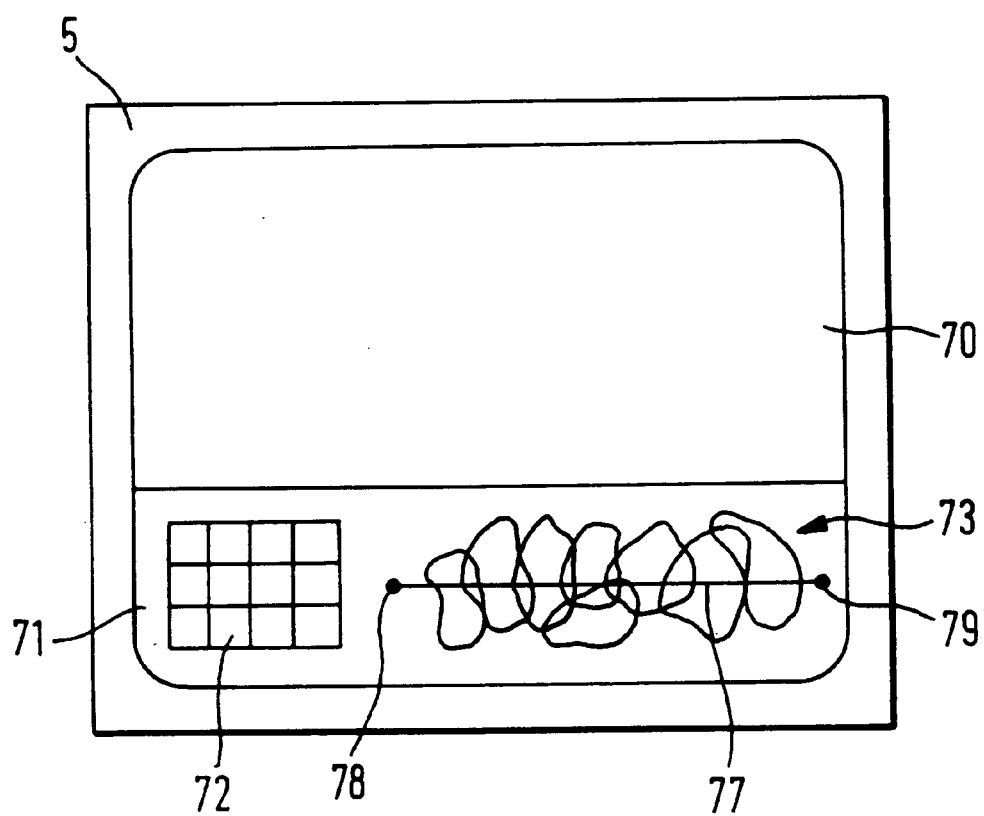
FIG. 8 shows an exemplary display.

In addition to mixing between two preselected colours depending on applied pressure it is possible to select colours from a predefined array in a look-up table or from a "palette" of colours predefined in an image portion by way of the user "painting" various colours into the image portion. As shown in FIG. 8 of the accompanying drawings the upper part of the monitor 5 is arranged to display an image or image portion 70 and the lower part is arranged to display a menu 71 containing, among other things a grid 72 of predefined colours and a palette area 73 in which colours selected from the grid 72 can be mixed by painting over or combining with other colours previously painted onto the palette. This enables a user to define his own colours and to paint with those colours as desired. Data defining the colours in the palette area 73 is stored in a separate area of the image store 2 or in a separate store.

Figure 9:
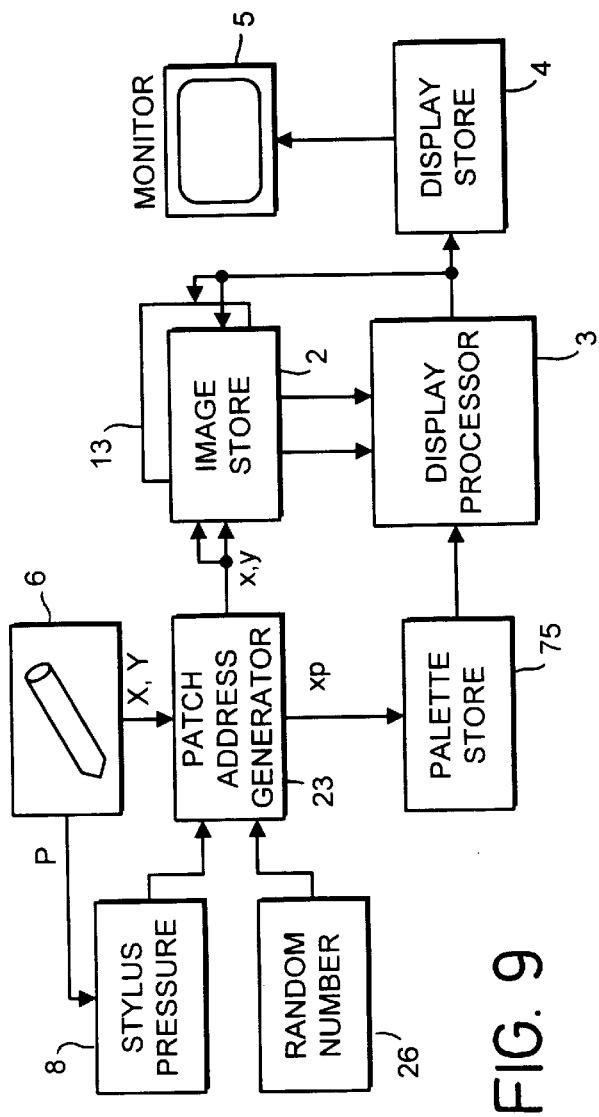
FIG. 9 shows a schematic block diagram of another modified version of the system.

FIG. 9 of the accompanying drawings shows part of the system 1 configured to enable pressure dependent selection of colours from the palette area. Previously described units have the same reference numbers as in FIG. 6 and therefore will not be described again herein. The patch address generator 23 is connected to receive pressure data from the stylus pressure register 7 and to generate therefrom address data $x_p$. The address data $x_p$ is output to a palette store 75 containing data defining colours in the palette 73. For the sake of simplicity in this example colours are taken from the palette along an arbitrary line 77 (see FIG. 8). Therefore, the address data $x_p$ generated by the address generator 11 is one dimensional (in x only). Since the pressure data also is one dimensional (in P only) this simplifies generation of $x_p$ by the address generator 11. For zero pressure a value of $x_p$ is generated corresponding to the start point 78 of the line 77 and for maximum pressure a value of $x_p$ is generated corresponding to the end point of the line is generated. For intermediate pressures a value of $x_p$ proportionately between the points 78 and 79 is generated.

Figure 10:
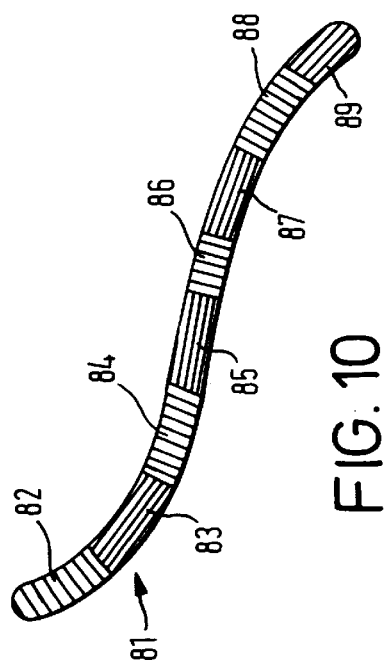
FIG. 10 shows an example of another effect that can be produced by the system.

A stylized example of a line 81 generated by the system 1, when configured as in FIG. 9, is shown in FIG. 10 of the accompanying drawings. The line 81 comprises several portions 82 to 89 each of a different colour depending on the pressure applied by the stylus to the touch tablet. Pressure is constant within each of the portions. A change in pressure results in the value of $x_p$ being altered which in turn changes the colour data selected from the palette store 75 for use in drawing the line.

Furthermore, the patch address generator 23 may be connected to a clock (not shown) which increments $x_p$ at regular time intervals or regular numbers of "stamping"

operations. In this way, the colour used in "painting" can be made to vary along the line 77 with time or the number of brush stamps "stamped" into the image data in the image store 2.

The patch address generator 11 may alternatively be connected to the random number generator 26. When so connected the patch address generator 11 will generate values of $x_p$ on a random basis causing colours to be selected at random from the palette store 75. The random number generator may also be used to select colours from a look-up table (not shown) or to combine two preselected colours, which combined colour is then used as the colour that is painted into the image data in the image store 2.

This random selection of colour can be combined with the "spray" effect described hereinabove. The result of randomising colour is to produce within a predefined area randomly sized and positioned dots of random colour.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. An electronic graphic system comprising:

an image store for storing data defining an image;

user operable means for generating position data representing a position and data representing another parameter;

a brush store for storing data defining a drawing implement as an initial patch of brush data of an initial size;

a spatial filter for filtering said brush data to produce filtered brush data occupying a patch of a size different than that of the initial patch; and a processor for processing a patch of initial image data in the image store at a location related to the position represented by the position data using said initial brush data or said filtered brush data depending on said other parameter data.

2. A system as claimed in claim 1, wherein the processor is arranged to process the stored image data by reading the patch of image data from the image store, modifying the patch of image data with the patch of initial brush data or filtered brush data and writing the patch of modified data back to the store so as to replace the patch of initial data previously stored therein.

3. A system as claimed in claim 1, wherein said user operable means comprises a stylus and touch tablet device.

4. A system as claimed in claim 3, wherein said other parameter data is proportional to pressure applied by the stylus to the touch tablet.

5. A system as claimed in claim 1, wherein the user operable means is operable to generate position data defining a sequence of positions and the processor is operable to process a patch of data from the image store for each position in the sequence so as to simulate the drawing of a line with a width dependent on said other parameter data at each position in the sequence in the image represented by the data in the image store.

6. A system as claimed in claim 1, wherein said spatial filter comprises a parameter calculator for calculating from said other parameter data filtering parameters to be applied to said brush data.

7. A system as claimed in claim 1, further comprising a store for storing other image data, and wherein said processor is operable to modify the patch of image data by combining the same with the other image data using the patch of initial brush data or filtered brush data.

8. A system as claimed in claim 7, wherein said other image data represents a selected colour.

9. A system as claimed in claim 7, wherein said other image data represents two selected colours, and the processor is arranged to combine the data representing the two colours to produce data representing a mixed colour for use in modifying the patch of image data.

10. A system as claimed in claim 8, wherein the colour is selected from a predefined set of colours.

11. A system as claimed in claim 10, wherein the predefined set of colours is determined from colour data held in a palette store.

12. A system as claimed in claim 8, wherein data representing a colour is selected depending on the value of the other parameter data.

13. A system as claimed in claim 1, wherein the processor is arranged to respond to the position data by identifying an area of initial image data in the store at a location related to the position represented by the input position data, and thereafter to process plural patches of initial image data from within the identified area.

14. A system as claimed in claim 13, wherein the processor is arranged to process the plural patches of initial image data from within the identified area by reading the plural patches of initial image data, modifying the plural patches of initial image data with the patch of initial or filtered brush data and writing the patches of modified image data back to the store so as to replace the patches of initial image data previously stored therein.

15. A system as claimed in claim 13, further comprising a store for storing data defining the size of the area and for storing data defining a distribution of different patch sizes within the area, the filter being responsive to the patch size distribution data to vary for each patch the patch size of the brush data depending on the position of each patch in the area.

16. A system as claimed in claim 15, further comprising an angle data generator and a random number generator, and wherein the processor is arranged to calculate the position of each patch within the area from the angle data generated by the angle data generator, the size data and one or more numbers generated by the random number generator.

17. A system as claimed in claim 15, wherein the processor is arranged to calculate the size of each of the plural patches within the area from the patch size distribution data and one or more numbers generated by the random number generator.

18. A system as claimed in claim 1, further comprising a limiting subsystem for limiting to a selected range the values represented by said other parameter data.

19. A system as claimed in claim 1, wherein said limiting sub-system comprises a modulator for modulating said other parameter data.

20. A system as claimed in claim 19, wherein said modulator is operable to modulate said other parameter data depending on said position data.

21. A system as claimed in claim 19, wherein said modulator is operable to modulate said other parameter data depending on time.

22. A system as claimed in claim 18, further comprising a random number generator for randomizing said other parameter data.

23. A method of processing image data, the method comprising:

storing data defining an image in a store;

generating position data representing a position and data representing another parameter;

storing data defining a drawing implement as a patch of brush data;

filtering said brush data to produce filtered brush data occupying a patch of a size different than that of the initial patch; and processing a patch of initial image data in the store at a location related to the position represented by the position data using said initial brush data or said filtered brush data depending on said other parameter data.

24. A method as claimed in claim 23, wherein the processing is effected by reading the patch of initial image data from the store, modifying the patch of image data with the patch of initial brush data or filtered brush data and writing the patch of modified data back to the store so as to replace the patch of initial data previously stored therein.

25. A method as claimed in claim 23, wherein said position data and said other data are generated by way of a stylus and touch tablet device and said other parameter data is proportional to pressure applied by the stylus to the touch tablet.

26. A method as claimed in claim 23, wherein the user operable means is operable to generate position data defining a sequence of positions and the processor is operable to process a patch of data from the image store for each position in the sequence so as to simulate the drawing of a line with a width dependent on said other parameter data at each position in the sequence in the image represented by the data in the image store.

27. A method as claimed in claim 23, further comprising calculating from said other parameter data filtering parameters to be applied to said brush data.

28. A method as claimed in claim 24, further comprising storing other image data, and thereafter modifying the patch of image data by combining the same with the other image data the patch of initial brush data or filtered brush data.

29. A method as claimed in claim 28, wherein said other image data represents a selected colour.

30. A method as claimed in claim 28, wherein said other image data represents two selected colours, the method further comprising combining the data representing the two colours to produce data representing a mixed colour for use in modifying the patch of image data.

31. A method as claimed in claim 30, wherein the colour is selected from a predefined set of colours.

32. A method as claimed in claim 31, wherein the predefined set of colours is determined from colour data held in a palette store.

33. A method as claimed in claim 29, wherein data representing a colour is selected depending on the value of the other parameter data.

34. A method as claimed in claim 24, further comprising responding to the position data by identifying an area of initial image data in the store at a location relating to the position represented by the position data, and thereafter processing plural patches of initial image data from within the identified area.

35. A method as claimed in claim 34, wherein the plural patches of initial image data are processed by reading the plural patches of initial image data, modifying the plural patches of initial image data with the patch of initial or filtered brush data and writing the patches of modified data back to the store so as to replace the patches of initial data previously stored therein.

36. A method as claimed in claim 34, further comprising storing data defining the size of the area, storing data defining a distribution of different patch sizes within the area, and responding to the patch size distribution data to vary for each patch the patch size of the brush data depending on the position of each patch in the area.

37. A method as claimed in claim 34, further comprising generating angle data, generating random numbers and calculating the position of each patch within the area from the angle data, the size data and one or more random numbers.

38. A method as claimed in claim 37, further comprising calculating the size of each of the plural patches within the area from the patch size distribution data and one or more numbers generated by the random number generator.

39. A method as claimed in claim 23, further comprising limiting to a selected range the values represented by said other parameter data.

40. A method as claimed in claim 23, further comprising modulating said other parameter data.

41. A method as claimed in claim 40, wherein said other parameter data is modulated depending on said position data.

42. A method as claimed in claim 40, wherein said other parameter data is modulated depending on time.

43. A method as claimed in claim 23, further comprising randomly generating said other parameter data.

* * * * *